(12) United States Patent
Chatterjee et al.

(10) Patent No.: US 11,587,146 B1
(45) Date of Patent: *Feb. 21, 2023

(54) WIRELESS BEACON SHOPPING EXPERIENCE

(71) Applicant: BLOCK, INC., Oakland, CA (US)

(72) Inventors: Shuvo Chatterjee, San Francisco, CA (US); Rishi Garg, San Francisco, CA (US)

(73) Assignee: Block, Inc., Oakland, CA (US)

( * ) Notice: Subject to any disclaimer, the term of this patent is extended or adjusted under 35 U.S.C. 154(b) by 985 days.

This patent is subject to a terminal disclaimer.

(21) Appl. No.: 16/220,094

(22) Filed: Dec. 14, 2018

Related U.S. Application Data

(63) Continuation of application No. 14/079,320, filed on Nov. 13, 2013, now Pat. No. 10,163,148.

(51) Int. Cl.
*G06Q 30/00* (2012.01)
*G06Q 30/0601* (2023.01)

(52) U.S. Cl.
CPC ..... *G06Q 30/0633* (2013.01); *G06Q 30/0631* (2013.01)

(58) Field of Classification Search
CPC ........ G06Q 40/00; G06Q 30/00; G06Q 30/02; G06Q 30/06; G06Q 30/0267
USPC ...................................................... 705/26.7
See application file for complete search history.

(56) References Cited

U.S. PATENT DOCUMENTS

| | | |
|---|---|---|
| 4,035,614 A | 7/1977 | Frattarola et al. |
| 4,254,441 A | 3/1981 | Fisher |
| 4,591,937 A | 5/1986 | Nakarai et al. |
| 4,845,740 A | 7/1989 | Tokuyama et al. |
| 5,266,789 A | 11/1993 | Anglin et al. |
| 5,434,400 A | 7/1995 | Scherzer |
| 5,463,678 A | 10/1995 | Kepley, III et al. |

(Continued)

FOREIGN PATENT DOCUMENTS

| | | |
|---|---|---|
| AU | 2017208387 A1 | 8/2017 |
| CA | 2 919 238 A1 | 1/2015 |

(Continued)

OTHER PUBLICATIONS

Non-Final Office Action dated Dec. 13, 2018, for U.S. Appl. No. 15/909,005, of Post, J.D., et al., filed Mar. 1, 2018.

(Continued)

*Primary Examiner* — Hani M Kazimi
(74) *Attorney, Agent, or Firm* — Polsinelli PC

(57) ABSTRACT

Methods, systems, and apparatus, including computer programs encoded on computer storage media, for using wireless beacons to manage shopping lists. One of the methods includes receiving, from a user, a selection of one or more items available for purchase at a physical store location of a store. A user device receives a signal from a wireless beacon installed in a particular section of the physical store location, wherein the signal emitted by the wireless beacon identifies the particular section of the store. If one or more items in the shopping list are located in the particular section, the one or more identified items that are located in the particular section are presented on a display device of the user device such that they appear above one or more items in the shopping list data that are not located in the particular section.

20 Claims, 5 Drawing Sheets

(56) References Cited

U.S. PATENT DOCUMENTS

| | | |
|---|---|---|
| 5,589,855 A | 12/1996 | Blumstein et al. |
| 5,764,742 A | 6/1998 | Howard et al. |
| 5,850,599 A | 12/1998 | Seiderman |
| 5,945,654 A | 8/1999 | Huang |
| 6,006,109 A | 12/1999 | Shin |
| 6,021,944 A | 2/2000 | Arakaki |
| 6,026,375 A | 2/2000 | Hall et al. |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,341,353 B1 | 1/2002 | Herman et al. |
| 6,363,139 B1 | 3/2002 | Zurek et al. |
| 6,374,176 B1 | 4/2002 | Schmier et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,526,275 B1 | 2/2003 | Calvert |
| 6,536,670 B1 | 3/2003 | Postman et al. |
| 6,579,728 B2 | 6/2003 | Grant et al. |
| 6,612,488 B2 | 9/2003 | Suzuki |
| 6,659,344 B2 | 12/2003 | Otto et al. |
| 6,820,062 B1 | 11/2004 | Gupta et al. |
| 6,832,721 B2 | 12/2004 | Fujii |
| 6,850,147 B2 | 2/2005 | Prokoski et al. |
| 6,868,391 B1 | 3/2005 | Hultgren |
| 6,888,443 B2 | 5/2005 | Ritter |
| 6,896,182 B2 | 5/2005 | Sakaguchi |
| 6,898,598 B2 | 5/2005 | Himmel et al. |
| 6,944,782 B2 | 9/2005 | von Mueller et al. |
| 6,957,334 B1 | 10/2005 | Goldstein et al. |
| 7,003,316 B1 | 2/2006 | Elias et al. |
| 7,149,296 B2 | 12/2006 | Brown et al. |
| 7,207,480 B1 | 4/2007 | Geddes |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,363,054 B2 | 4/2008 | Elias et al. |
| 7,376,431 B2 | 5/2008 | Niedermeyer |
| 7,376,433 B1 | 5/2008 | Hose |
| 7,376,583 B1 | 5/2008 | Rolf |
| 7,403,762 B2 | 7/2008 | Morgan et al. |
| 7,409,234 B2 | 8/2008 | Glezerman |
| 7,433,452 B2 | 10/2008 | Taylor et al. |
| 7,506,812 B2 | 3/2009 | von Mueller et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| 7,620,404 B2 | 11/2009 | Chesnais et al. |
| 7,684,809 B2 | 3/2010 | Niedermeyer |
| 7,708,189 B1 | 5/2010 | Cipriano |
| 7,711,100 B2 | 5/2010 | Dennis |
| 7,793,834 B2 | 9/2010 | Hachey et al. |
| 7,810,729 B2 | 10/2010 | Morley |
| 7,848,765 B2 | 12/2010 | Phillips et al. |
| 7,869,591 B1 | 1/2011 | Nagel et al. |
| 7,896,248 B2 | 3/2011 | Morley |
| 7,918,394 B1 | 4/2011 | Morley, Jr. |
| 7,945,494 B2 | 5/2011 | Williams |
| 8,050,984 B2 | 11/2011 | Bonner et al. |
| 8,090,351 B2 | 1/2012 | Klein |
| 8,135,624 B1 | 3/2012 | Ramalingam et al. |
| 8,231,055 B2 | 7/2012 | Wen |
| 8,376,239 B1 | 2/2013 | Humphrey |
| 8,413,901 B2 | 4/2013 | Wen |
| 8,438,066 B1 | 5/2013 | Yuen et al. |
| 8,509,734 B1 | 8/2013 | Gupta et al. |
| 8,554,670 B1 | 10/2013 | Blank et al. |
| 8,684,261 B2 | 4/2014 | Burdett et al. |
| 8,707,319 B2 | 4/2014 | Nguyen et al. |
| 8,750,901 B1 | 6/2014 | Gupta et al. |
| 8,766,791 B2 | 7/2014 | Koen et al. |
| 9,055,400 B1 | 6/2015 | Lee |
| 9,113,344 B1 | 8/2015 | Lee |
| 9,204,257 B1 | 12/2015 | Mendelson |
| 9,264,850 B1 | 2/2016 | Lee |
| 9,373,112 B1 | 6/2016 | Henderson et al. |
| 9,407,689 B1 | 8/2016 | Casares et al. |
| 9,451,397 B1 | 9/2016 | Lee |
| 9,576,289 B2 | 2/2017 | Henderson et al. |
| 9,633,352 B2 | 4/2017 | Henderson et al. |
| 9,652,791 B1 | 5/2017 | Brock |
| 9,665,858 B1 | 5/2017 | Kumar |
| 9,730,015 B1 | 8/2017 | Lee |
| 9,767,474 B1 | 9/2017 | Ramalingam et al. |
| 9,805,370 B1 | 10/2017 | Quigley et al. |
| 9,838,840 B1 | 12/2017 | Lee |
| 9,875,471 B1 | 1/2018 | Myrick et al. |
| 9,924,322 B2 | 3/2018 | Post et al. |
| 9,959,529 B1 | 5/2018 | Varma et al. |
| 10,026,083 B1 | 7/2018 | Varma et al. |
| 10,163,148 B1 | 12/2018 | Chatterjee et al. |
| 10,332,162 B1 | 6/2019 | Brock et al. |
| 10,373,151 B1 | 8/2019 | Lee |
| 10,885,522 B1 | 1/2021 | Brock |
| 2001/0001856 A1 | 5/2001 | Gould et al. |
| 2001/0011250 A1 | 8/2001 | Paltenghe et al. |
| 2002/0002507 A1 | 1/2002 | Hatakeyama |
| 2002/0013815 A1 | 1/2002 | Obradovich et al. |
| 2002/0030871 A1 | 3/2002 | Anderson et al. |
| 2002/0049644 A1 | 4/2002 | Kargman |
| 2002/0077974 A1 | 6/2002 | Ortiz |
| 2002/0099648 A1 | 7/2002 | DeVoe et al. |
| 2002/0108062 A1 | 8/2002 | nakajima et al. |
| 2002/0128967 A1 | 9/2002 | Meyer et al. |
| 2002/0169541 A1 | 11/2002 | Bouve et al. |
| 2002/0198818 A1 | 12/2002 | Scott et al. |
| 2003/0004842 A1 | 1/2003 | Williams et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2003/0194071 A1 | 10/2003 | Ramian |
| 2003/0200179 A1 | 10/2003 | Kwan |
| 2003/0200180 A1 | 10/2003 | Phelan et al. |
| 2004/0002897 A1 | 1/2004 | Vishik |
| 2004/0002903 A1 | 1/2004 | Stolfo et al. |
| 2004/0006510 A1 | 1/2004 | Lertzman et al. |
| 2004/0012875 A1 | 1/2004 | Wood |
| 2004/0015475 A1 | 1/2004 | Scheepsma |
| 2004/0041911 A1 | 3/2004 | Odagiri et al. |
| 2004/0049451 A1 | 3/2004 | Berardi et al. |
| 2004/0064378 A1 | 4/2004 | Yoshida |
| 2004/0093274 A1 | 5/2004 | Vanska et al. |
| 2004/0093496 A1 | 5/2004 | Colnot |
| 2004/0104268 A1 | 6/2004 | Bailey |
| 2004/0107170 A1 | 6/2004 | Labrou et al. |
| 2004/0127256 A1 | 7/2004 | Goldthwaite et al. |
| 2004/0128256 A1 | 7/2004 | Krouse et al. |
| 2004/0193553 A1 | 9/2004 | Lloyd et al. |
| 2004/0204074 A1 | 10/2004 | Desai |
| 2005/0004757 A1 | 1/2005 | Neeman et al. |
| 2005/0048961 A1 | 3/2005 | Ribaudo et al. |
| 2005/0077870 A1 | 4/2005 | Ha et al. |
| 2005/0159133 A1 | 7/2005 | Hasan et al. |
| 2005/0242173 A1 | 11/2005 | Suzuki |
| 2005/0251440 A1 | 11/2005 | Bednarek |
| 2005/0256782 A1 | 11/2005 | Sands et al. |
| 2005/0266798 A1 | 12/2005 | Moloney et al. |
| 2006/0089909 A1 | 4/2006 | Mcleod et al. |
| 2006/0094481 A1 | 5/2006 | Gullickson |
| 2006/0122902 A1 | 6/2006 | Petrov et al. |
| 2006/0200378 A1 | 9/2006 | Sorensen |
| 2006/0208066 A1 | 9/2006 | Finn et al. |
| 2006/0223580 A1 | 10/2006 | Antonio et al. |
| 2006/0234771 A1 | 10/2006 | Shavrov |
| 2006/0282864 A1 | 12/2006 | Gupte |
| 2006/0293968 A1 | 12/2006 | Brice et al. |
| 2007/0030824 A1 | 2/2007 | Ribaudo et al. |
| 2007/0067833 A1 | 3/2007 | Colnot |
| 2007/0072678 A1 | 3/2007 | Dagres |
| 2007/0100651 A1 | 5/2007 | Ramer et al. |
| 2007/0118429 A1 | 5/2007 | Subotovsky |

(56) References Cited

U.S. PATENT DOCUMENTS

| | | |
|---|---|---|
| 2007/0124211 A1 | 5/2007 | Smith |
| 2007/0138268 A1 | 6/2007 | Tuchman |
| 2007/0150369 A1 | 6/2007 | Zivin |
| 2007/0150414 A1 | 6/2007 | Templeton |
| 2007/0155430 A1 | 7/2007 | Cheon et al. |
| 2007/0221728 A1 | 9/2007 | Ferro et al. |
| 2007/0244778 A1 | 10/2007 | Bailard |
| 2007/0244811 A1 | 10/2007 | Tumminaro |
| 2007/0250623 A1 | 10/2007 | Hickey et al. |
| 2007/0255653 A1 | 11/2007 | Tumminaro et al. |
| 2007/0282700 A1 | 12/2007 | Masse |
| 2007/0299722 A1 | 12/2007 | Stoffelsma et al. |
| 2008/0027815 A1 | 1/2008 | Johnson et al. |
| 2008/0040219 A1 | 2/2008 | Kim et al. |
| 2008/0040274 A1 | 2/2008 | Uzo |
| 2008/0054072 A1 | 3/2008 | Katragadda et al. |
| 2008/0059297 A1 | 3/2008 | Vallier et al. |
| 2008/0059370 A1 | 3/2008 | Sada et al. |
| 2008/0059375 A1 | 3/2008 | Abifaker |
| 2008/0061150 A1 | 3/2008 | Phillips |
| 2008/0084977 A1 | 4/2008 | Nayak et al. |
| 2008/0147507 A1 | 6/2008 | Langhammer |
| 2008/0147564 A1 | 6/2008 | Singhal |
| 2008/0177662 A1 | 7/2008 | Smith et al. |
| 2008/0189170 A1 | 8/2008 | Ramachandra et al. |
| 2008/0195428 A1 | 8/2008 | O'Sullivan |
| 2008/0215380 A1 | 9/2008 | Graeber |
| 2008/0238610 A1 | 10/2008 | Rosenberg |
| 2008/0242278 A1 | 10/2008 | Rekimoto |
| 2008/0249865 A1 | 10/2008 | Angell et al. |
| 2008/0249882 A1 | 10/2008 | Spolar |
| 2008/0249939 A1 | 10/2008 | Veenstra |
| 2008/0277183 A1 | 11/2008 | Huang et al. |
| 2008/0306678 A1 | 12/2008 | Miyawaki |
| 2009/0024533 A1 | 1/2009 | Fernandes et al. |
| 2009/0030885 A1 | 1/2009 | DePasquale et al. |
| 2009/0043696 A1 | 2/2009 | Ornce et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0132413 A1 | 5/2009 | Engelbrecht |
| 2009/0159681 A1 | 6/2009 | Mullen et al. |
| 2009/0166422 A1 | 7/2009 | Biskupski |
| 2009/0171844 A1 | 7/2009 | Olliphant et al. |
| 2009/0210334 A1 | 8/2009 | Russell |
| 2009/0216676 A1 | 8/2009 | Mathur et al. |
| 2009/0287408 A1 | 11/2009 | Gerdes et al. |
| 2009/0298514 A1 | 12/2009 | Ullah |
| 2009/0328052 A1 | 12/2009 | Nguyen et al. |
| 2010/0057503 A1 | 3/2010 | Katz |
| 2010/0063893 A1 | 3/2010 | Townsend |
| 2010/0087144 A1 | 4/2010 | Korenshtein |
| 2010/0125495 A1 | 5/2010 | Smith et al. |
| 2010/0131764 A1 | 5/2010 | Goh |
| 2010/0135178 A1 | 6/2010 | Aggarwal et al. |
| 2010/0144375 A1 | 6/2010 | Pfister et al. |
| 2010/0145868 A1 | 6/2010 | Niedermeyer |
| 2010/0184479 A1 | 7/2010 | Griffin |
| 2010/0191653 A1 | 7/2010 | Johnson et al. |
| 2010/0197325 A1 | 8/2010 | Dredge |
| 2010/0243732 A1 | 9/2010 | Wallner |
| 2010/0287250 A1 | 11/2010 | Carlson et al. |
| 2010/0306080 A1 | 12/2010 | Trandal et al. |
| 2010/0328029 A1 | 12/2010 | Kolek |
| 2011/0045840 A1 | 2/2011 | Alizadeh-Shabdiz et al. |
| 2011/0047037 A1 | 2/2011 | Wu |
| 2011/0060600 A1 | 3/2011 | Fox et al. |
| 2011/0063138 A1 | 3/2011 | Berkobin et al. |
| 2011/0084131 A1 | 4/2011 | McKelvey |
| 2011/0084139 A1 | 4/2011 | McKelvey et al. |
| 2011/0084147 A1 | 4/2011 | Wilson et al. |
| 2011/0090124 A1 | 4/2011 | Liu et al. |
| 2011/0137773 A1 | 6/2011 | Davis, III et al. |
| 2011/0137803 A1 | 6/2011 | Willins |
| 2011/0153495 A1 | 6/2011 | Dixon et al. |
| 2011/0161235 A1 | 6/2011 | Beenau et al. |
| 2011/0180601 A1 | 7/2011 | Morley |
| 2011/0198395 A1 | 8/2011 | Chen |
| 2011/0202393 A1 | 8/2011 | DeWakar et al. |
| 2011/0202463 A1 | 8/2011 | Powell |
| 2011/0208612 A1 | 8/2011 | Shader et al. |
| 2011/0213652 A1 | 9/2011 | Gillen et al. |
| 2011/0238476 A1 | 9/2011 | Carr et al. |
| 2011/0238517 A1 | 9/2011 | Ramalingam et al. |
| 2011/0249668 A1 | 10/2011 | Van Milligan et al. |
| 2011/0258120 A1 | 10/2011 | Weiss |
| 2012/0005096 A1 | 1/2012 | Dorsey et al. |
| 2012/0008851 A1 | 1/2012 | Pennock et al. |
| 2012/0012653 A1 | 1/2012 | Johnson et al. |
| 2012/0052874 A1 | 3/2012 | Kumar |
| 2012/0052910 A1 | 3/2012 | Mu et al. |
| 2012/0101942 A1 | 4/2012 | Park |
| 2012/0109781 A1 | 5/2012 | Felt et al. |
| 2012/0115512 A1 | 5/2012 | Grainger et al. |
| 2012/0116861 A1 | 5/2012 | Dobyns |
| 2012/0128089 A1 | 5/2012 | Tsutsui |
| 2012/0130895 A1 | 5/2012 | Granbery et al. |
| 2012/0149390 A1 | 6/2012 | Gravely et al. |
| 2012/0158500 A1 | 6/2012 | Hochstatter et al. |
| 2012/0166267 A1 | 6/2012 | Beatty et al. |
| 2012/0195295 A1 | 8/2012 | Elmaleh |
| 2012/0209686 A1 | 8/2012 | Horowitz et al. |
| 2012/0209773 A1 | 8/2012 | Ranganathan |
| 2012/0235812 A1 | 9/2012 | Maia et al. |
| 2012/0252500 A1 | 10/2012 | Mitsuya et al. |
| 2012/0278150 A1 | 11/2012 | Chen |
| 2012/0278172 A1 | 11/2012 | Mercuri et al. |
| 2012/0296724 A1 | 11/2012 | Faro et al. |
| 2012/0303425 A1 | 11/2012 | Katzin et al. |
| 2012/0310760 A1 | 12/2012 | Phillips et al. |
| 2013/0002840 A1 | 1/2013 | Toney et al. |
| 2013/0024018 A1 | 1/2013 | Chang et al. |
| 2013/0027227 A1 | 1/2013 | Nordstrom |
| 2013/0030931 A1 | 1/2013 | Moshfeghi |
| 2013/0054281 A1 | 2/2013 | Thakkar et al. |
| 2013/0073365 A1 | 3/2013 | McCarthy |
| 2013/0079037 A1 | 3/2013 | Dobyns |
| 2013/0080289 A1* | 3/2013 | Roy .................. G06Q 20/322 705/26.8 |
| 2013/0110659 A1 | 5/2013 | Phillips et al. |
| 2013/0132274 A1 | 5/2013 | Henderson et al. |
| 2013/0144715 A1 | 6/2013 | Kranzley et al. |
| 2013/0157685 A1 | 6/2013 | Young |
| 2013/0185123 A1 | 7/2013 | Krivopaltsev et al. |
| 2013/0191195 A1 | 7/2013 | Carlson et al. |
| 2013/0217332 A1 | 8/2013 | Altman et al. |
| 2013/0217333 A1 | 8/2013 | Sprigg et al. |
| 2013/0226800 A1 | 8/2013 | Patel et al. |
| 2013/0238540 A1 | 9/2013 | O'Donoghue et al. |
| 2013/0268378 A1 | 10/2013 | Yovin |
| 2013/0282438 A1 | 10/2013 | Hunter et al. |
| 2013/0297422 A1 | 11/2013 | Hunter et al. |
| 2013/0304898 A1 | 11/2013 | Aggarwal et al. |
| 2014/0028440 A1 | 1/2014 | Takeuchi et al. |
| 2014/0052615 A1 | 2/2014 | Andersen |
| 2014/0068719 A1 | 3/2014 | Kiukkonen et al. |
| 2014/0123043 A1 | 5/2014 | Schmidt et al. |
| 2014/0149282 A1 | 5/2014 | Philliou et al. |
| 2014/0179340 A1 | 6/2014 | Do et al. |
| 2014/0187257 A1 | 7/2014 | Emadzadeh et al. |
| 2014/0370879 A1 | 12/2014 | Redding et al. |
| 2015/0006308 A1* | 1/2015 | Lin .................. G06Q 30/0633 705/26.2 |
| 2015/0031388 A1 | 1/2015 | Chatterjee et al. |
| 2015/0079942 A1 | 3/2015 | Kostka et al. |
| 2015/0126119 A1 | 5/2015 | Schulz et al. |
| 2015/0178698 A1 | 6/2015 | Schulz et al. |
| 2016/0019531 A1 | 1/2016 | Gormley |
| 2016/0210606 A1 | 7/2016 | Henderson et al. |

(56) References Cited

U.S. PATENT DOCUMENTS

| | | |
|---|---|---|
| 2016/0259616 A1 | 9/2016 | Hosein et al. |
| 2018/0227712 A1 | 8/2018 | Post et al. |

FOREIGN PATENT DOCUMENTS

| | | |
|---|---|---|
| EP | 2 506 642 A1 | 10/2012 |
| JP | 2004-078662 A | 3/2004 |
| JP | 2005-269172 A | 9/2005 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 2010/097711 A2 | 9/2010 |
| WO | 2010/135174 A1 | 11/2010 |
| WO | 2013/009891 A1 | 1/2013 |
| WO | 2015/013170 A1 | 1/2015 |

OTHER PUBLICATIONS

Final Office Action dated Dec. 13, 2018, for U.S. Appl. No. 15/084,390, of Henderson, W., et al., filed Mar. 29, 2016.
Examiner Requisition for Canadian Patent Application No. 2,919,238, mailed Dec. 20, 2018.
Non-Final Office Action dated Dec. 31, 2018, for U.S. Appl. No. 15/445,380, of Brock, Z., filed Feb. 28, 2017.
Notice of Allowance dated Feb. 4, 2019, for U.S. Appl. No. 14/042,366, of Brock, Z., filed Sep. 30, 2013.
Advisory Action dated Feb. 8, 2019, for U.S. Appl. No. 14/941,020, of Lee, B., filed Nov. 13, 2015.
Examination Report No. 3 for Australian Patent Application No. 2017208387, dated Feb. 11, 2019.
Notice Of Allowance dated Mar. 15, 2019, for U.S. Appl. No. 14/941,020 of Lee, B., filed Nov. 13, 2015.
Advisory Action dated Mar. 29, 2019, for U.S. Appl. No. 15/084,390, of Henderson, W., et al., filed Mar. 29, 2016.
International Search Report and Written Opinion for International Application No. PCT/US2012/046282, dated Oct. 4, 2012.
International Search Report and Written Opinion for International Application No. PCT/US2014/047381 dated Nov. 25, 2014.
"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-SID . . . , on Apr. 19, 2011, pp. 1-2.
"Arduino magnetic stripe decoder," Instructables, Retrieved from the Internet URL: http://www.instructables.com/id/Arduino-magneticstripe-decorder/, on Feb. 8, 2011, pp. 1-5.
"Barcode scanner and Magnetic Stripe Reader (MSR) for Pocke . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . , on Feb. 11, 2011, pp. 1-3.
"Headphone Jack (3.5mm)," Retrieved from the Internet URL: http://www.phonescoop.com/glossary/term.php?gid=440, on May 5, 2011, pp. 1-1.
"Magnetic Card Reader," lekernel.net-scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers the hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Uber—Android Apps on Google Play," dated Nov. 10, 2014, Retrieved from the internet URL: https://play.google.com/store/apps/details?id=com.ubercab&hl=en, on Nov. 12, 2014, pp. 2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.
Burke, R.R., "The Third Wave of Marketing Intelligence," Retailing in the 21st Century: Current and Future Trends, pp. 103-115 (2010).
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Chediak, M., "Retail technology; Grocers get taste of future; Store owners who want to stand out in the crowd these days are embracing cutting-edge services," The Orlando Sentinel, pp. 1-2 (Jan. 21, 2006).
Finzgar et al.; "Use of NFC and QR code identification in an electronic ticket system for public transport"; Published in SoftCOM 2011, 19th International Conference on Software, Telecommunications and Computer networks; Published Nov. 1, 2011 (Year: 2011).

(56) References Cited

OTHER PUBLICATIONS

Goode, L., "Paying With Square's New Mobile-Payments App," All Things D., published on Apr. 30, 2012, Retrieved from the Internet URL: http://allthingsd.com/20120430/paying-with-squares-new-mobile-payments-app/, on Nov. 7, 2014, pp. 1-3.
Grandison, K., "vTerminal Credit Card Processing App for Authorize Net and PayPal Payflow Pro for Curve 8350 3500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworkImagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Shekar, S., et al., "iGrocer—A Ubiquitous and Pervasive Smart Grocery Shopping System," Proceedings of the 2003 ACM Symposium on Applied Computing, pp. 645-652 (Mar. 9, 2003).
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Non-Final Office Action dated Aug. 7, 2009, for U.S. Appl. No. 12/050,752, of Niedermeyer, B.J., filed Mar. 18, 2008.
Notice of Allowance dated Dec. 16, 2009, for U.S. Appl. No. 12/050,752, of Niedermeyer, B.J., filed Mar. 18, 2008.
Von-Final Office Action dated Sep. 10, 2010, for U.S. Appl. No. 12/707,228, of Niedermeyer, B.J., filed Feb. 17, 2010.
Final Office Action dated Mar. 31, 2011, for U.S. Appl. No. 12/707,228, of Niedermeyer, B.J., filed Feb. 17, 2010.
Non-Final Office Action dated Oct. 10, 2012, for U.S. Appl. No. 13/179,832, of Dorsey, J., et al., filed Jul. 11, 2011.
Final Office Action dated Jun. 27, 2013, for U.S. Appl. No. 13/179,832, of Dorsey, J., et al., filed Jul. 11, 2011.
Advisory Action dated Oct. 24, 2013, for U.S. Appl. No. 13/179,832, of Dorsey, J., et al., filed Jul. 11, 2011.
Non-Final Office Action dated Jan. 8, 2014, for U.S. Appl. No. 13/179,832, of Dorsey, J., et al., filed Jul. 11, 2011.

Non Final Office Action dated Dec. 1, 2014, for U.S. Appl. No. 13/802,064, of Lee, B., filed Mar. 13, 2013.
Notice of Allowance dated Feb. 6, 2015, for U.S. Appl. No. 13/802,290, of Lee, B., filed Mar. 13, 2013.
Final Office Action dated Mar. 20, 2015, for U.S. Appl. No. 13/802,064, of Lee, B., filed Mar. 13, 2013.
Notice of Allowance dated Apr. 13, 2015, for U.S. Appl. No. 13/801,340, of Lee, B., filed Mar. 13, 2013.
Non Final Office Action dated Oct. 1, 2015, for U.S. Appl. No. 14/803,850, of Lee, B., filed Jul. 20, 2015.
Notice of Allowance dated Oct. 13, 2015, for U.S. Appl. No. 13/802,064, of Lee, B., filed Mar. 13, 2013.
Non-Final Office action dated Oct. 19, 2015, for U.S. Appl. No. 13/948,871, of Post, J.D., et al., filed Jul. 23, 2013.
Non Final Office Action dated Jan. 13, 2016, for U.S. Appl. No. 14/726,165, of Lee, B., filed May 29, 2015.
Non-Final Office Action dated Mar. 10, 2016, for U.S. Appl. No. 14/065,760, of Henderson, W., et al., fied Oct. 29, 2013.
Notice of Allowance dated May 12, 2016, for U.S. Appl. No. 14/726,165, of Lee, B., filed May 29, 2015.
Final Office action dated May 17, 2016, for U.S. Appl. No. 13/948,871, of Post, J.D., et al., filed Jul. 23, 2013.
Final Office Action dated Jul. 6, 2016, for U.S. Appl. No. 14/065,760, of Henderson, W., et al., filed Oct. 29, 2013.
Final Office Action dated Jul. 22, 2016, for U.S. Appl. No. 14/803,850, of Lee, B., filed Jul. 20, 2015.
Non-Final Office Action dated Jul. 29, 2016, for U.S. Appl. No. 14/079,320, of Chatterjee, S., et al., filed Nov. 13, 2013.
Examination Report No. 1 for Australian Patent Application No. 2014293388, dated Aug. 2, 2016.
Advisory Action dated Sep. 1, 2016, for U.S. Appl. No. 13/948,871, of Post, J.D., et al., filed Jul. 23, 2013.
Non-Final Office Action dated Sep. 28, 2016, for U.S. Appl. No. 14/042,366, of Brock, Z., et al., filed Sep. 30, 2013.
Non-Final Office action dated Dec. 16, 2016, for U.S. Appl. No. 13/948,871, of Post, J.D., et al., filed Jul. 23, 2013.
Examiner Requisition for Canadian Patent Application No. 2,919,238, mailed Feb. 6, 2017.
Non Final Office Action dated Mar. 1, 2017, for U.S. Appl. No. 14/941,020, of Lee, B., filed Nov. 13, 2015.
Non-Final Office Action dated Apr. 4, 2017, for U.S. Appl. No. 15/269,865, of Lee, B., filed Sep. 19, 2016.
Non-Final Office Action dated Apr. 6, 2017, for U.S. Appl. No. 14/065,760, of Henderson, W., et al., filed Oct. 29, 2013.
Notice of Allowance dated Apr. 7, 2017, for U.S. Appl. No. 14/803,850, of Lee, B., filed Jul. 20, 2015.
Final Office Action dated Apr. 11, 2017, for U.S. Appl. No. 14/079,320, of Chatterjee, S., et al., filed Nov. 13, 2013.
Non-Final Office Action dated May 4, 2017, for U.S. Appl. No. 15/084,390, of Henderson, W., et al., filed Mar. 29, 2016.
Advisory Action dated Jul. 20, 2017, for U.S. Appl. No. 14/079,320, of Chatterjee, S., et al., filed Nov. 13, 2013.
Final Office action dated Jul. 20, 2017, for U.S. Appl. No. 13/948,871, of Post, J.D., et al., filed Jul. 23, 2013.
Notice of Allowance dated Jul. 25, 2017, for U.S. Appl. No. 15/269,865, of Lee, B., filed Sep. 19, 2016.
Final Office Action dated Sep. 27, 2017, for U.S. Appl. No. 14/941,020, of Lee, B., filed Nov. 13, 2015.
Advisory Action dated Oct. 5, 2017, for U.S. Appl. No. 13/948,871, of Post, J.D., et al., filed Jul. 23, 2013.
Non-Final Office Action dated Oct. 6, 2017, for U.S. Appl. No. 14/079,320, of Chatterjee, S., et al., filed Nov. 13, 2013.
Final Office Action dated Oct. 18, 2017, for U.S. Appl. No. 15/084,390, of Henderson, W., et al., filed Mar. 29, 2016.
Final Office Action dated Nov. 1, 2017, for U.S. Appl. No. 14/065,760, of Henderson, W., et al., filed Oct. 29, 2013.
Notice of Allowance dated Nov. 6, 2017, for U.S. Appl. No. 13/948,871, of Post, J.D., et al., filed Jul. 23, 2013.
Advisory Action dated Jan. 4, 2018, for U.S. Appl. No. 14/941,020, of Lee, B., filed Nov. 13, 2015.
Final Office Action dated Jan. 8, 2018, for U.S. Appl. No. 14/042,366, of Brock, Z., et al., filed Sep. 30, 2013.

(56) References Cited

OTHER PUBLICATIONS

Examiner Requisition for Canadian Patent Application No. 2,919,238, mailed Feb. 9, 2018.
Final Office Action dated Feb. 22, 2018, for U.S. Appl. No. 14/079,320, of Chatterjee, S., et al., filed Nov. 13, 2013.
Examination Report No. 1 for Australian Patent Application No. 2017208387, dated Feb. 26, 2018.
Advisory Action dated Feb. 28, 2018, for U.S. Appl. No. 14/065,760, of Henderson, W., et al., filed Oct. 29, 2013.
Non-Final Office Action dated Mar. 22, 2018, for U.S. Appl. No. 14/941,020, of Lee, B., filed Nov. 13, 2015.
Advisory Action dated May 15, 2018, for U.S. Appl. No. 14/042,366, of Brock, Z., et al., filed Sep. 30, 2013.
Non-Final Office Action dated May 16, 2018, for U.S. Appl. No. 15/084,390, of Henderson, W., et al., filed Mar. 29, 2016.
Non-Final Office Action dated Jun. 25, 2018, for U.S. Appl. No. 14/042,366, of Brock, Z., et al., filed Sep. 30, 2013.
Non-Final Office Action dated Aug. 6, 2018, for U.S. Appl. No. 14/065,760, of Henderson, W., et al., filed Oct. 29, 2013.
Notice of Allowance dated Aug. 8, 2018, for U.S. Appl. No. 14/079,320, of Chatterjee, S., et al., filed Nov. 13, 2013.
Final Office Action dated Oct. 30, 2018, for U.S. Appl. No. 14/941,020, of Lee, B., filed Nov. 13, 2015.
Examination Report No. 2 for Australian Patent Application No. 2017208387, dated Nov. 9, 2018.
Final Office Action dated Apr. 17, 2020, for U.S. Appl. No. 15/445,380, of Brock, Z., filed Feb. 28, 2017.
Notice of Allowance dated May 14, 2020, for U.S. Appl. No. 15/084,390, of Henderson, W., et al., filed Mar. 29, 2016.
Advisory Action dated Jul. 8, 2019, for U.S. Appl. No. 14/065,760, of Henderson, W., et al., filed Oct. 29, 2013.
Final Office Action dated Jul. 8, 2019, for U.S. Appl. No. 15/445,380, of Brock, Z., filed Feb. 28, 2017.
Notice of Allowance dated Sep. 25, 2019, for U.S. Appl. No. 15/909,005, of Post, D. J., et al., filed Jan. 3, 2018.
Advisory Action dated Sep. 26, 2019, for U.S. Appl. No. 15/445,380, of Brock, Z., filed Feb. 28, 2017.
Advisory Action dated Jul. 2, 2020, for U.S. Appl. No. 15/445,380, of Brock, Z., filed Feb. 28, 2017.
Non-Final Office Action dated Aug. 17, 2021, for U.S. Appl. No. 14/065,760, of Henderson, W., et al., filed Oct. 29, 2013.
Notice of Allowance for Canadian Patent Application No. 2,919,238, dated Jun. 15, 2021.
Final Office Action dated Apr. 4, 2019, for U.S. Appl. No. 14/065,760, of Henderson, W., et al., filed Oct. 29, 2013.
Final Office Action dated Apr. 4, 2019, for U.S. Appl. No. 15/909,005, of Post, D. J., et al., filed Jan. 3, 2018.
Advisory Action dated Jun. 17, 2019, for U.S. Appl. No. 15/909,005, of Post, D. J., et al., filed Jan. 3, 2018.
Final Office Action dated Feb. 22, 2022, for U.S. Appl. No. 14/065,760, of Henderson, W., et al., filed Oct. 29, 2013.
Notice of Acceptance for Australian Patent Application No. 2019201310, dated Jul. 21, 2020.
Notice of Allowance dated Sep. 2, 2020, for U.S. Appl. No. 15/445,380, of Brock, Z., filed Feb. 28, 2017.
Notice of Allowance dated May 12, 2022, for U.S. Appl. No. 14/065,760, of Henderson, W., et al., filed Oct. 29, 2013.
Notice of Grant for Australian Patent Application No. 2019201310, dated Nov. 12, 2020.
Non-Final Office Action dated Oct. 30, 2019, for U.S. Appl. No. 15/084,390, of Henderson, W., et al., filed Mar. 29, 2016.
Non-Final Office Action dated Oct. 31, 2019, for U.S. Appl. No. 15/445,380, of Brock, Z., filed Feb. 28, 2017.
Examiner Requisition for Canadian Patent Application No. 2,919,238, mailed Nov. 5, 2019.
Examination report for Australian Patent Application No. 2019201310, dated Nov. 25, 2019.

* cited by examiner

WIRELESS BEACON SHOPPING EXPERIENCE

CROSS-REFERENCE TO RELATED APPLICATIONS

This application claims priority to and is a continuation of U.S. patent application Ser. No. 14/079,320, filed on Nov. 13, 2013, entitled "WIRELESS BEACON SHOPPING EXPERIENCE," the entirety of which is herein incorporated by reference.

BACKGROUND

This specification relates to wireless communication between devices.

Fixed radio receivers can also be used to triangulate a location of a mobile device. Mobile device locations can also be determined using Global Positioning System (GPS) signals.

BRIEF DESCRIPTION OF THE DRAWINGS

Like reference numbers and designations in the various drawings indicate like elements.

DETAILED DESCRIPTION

Figure 1:
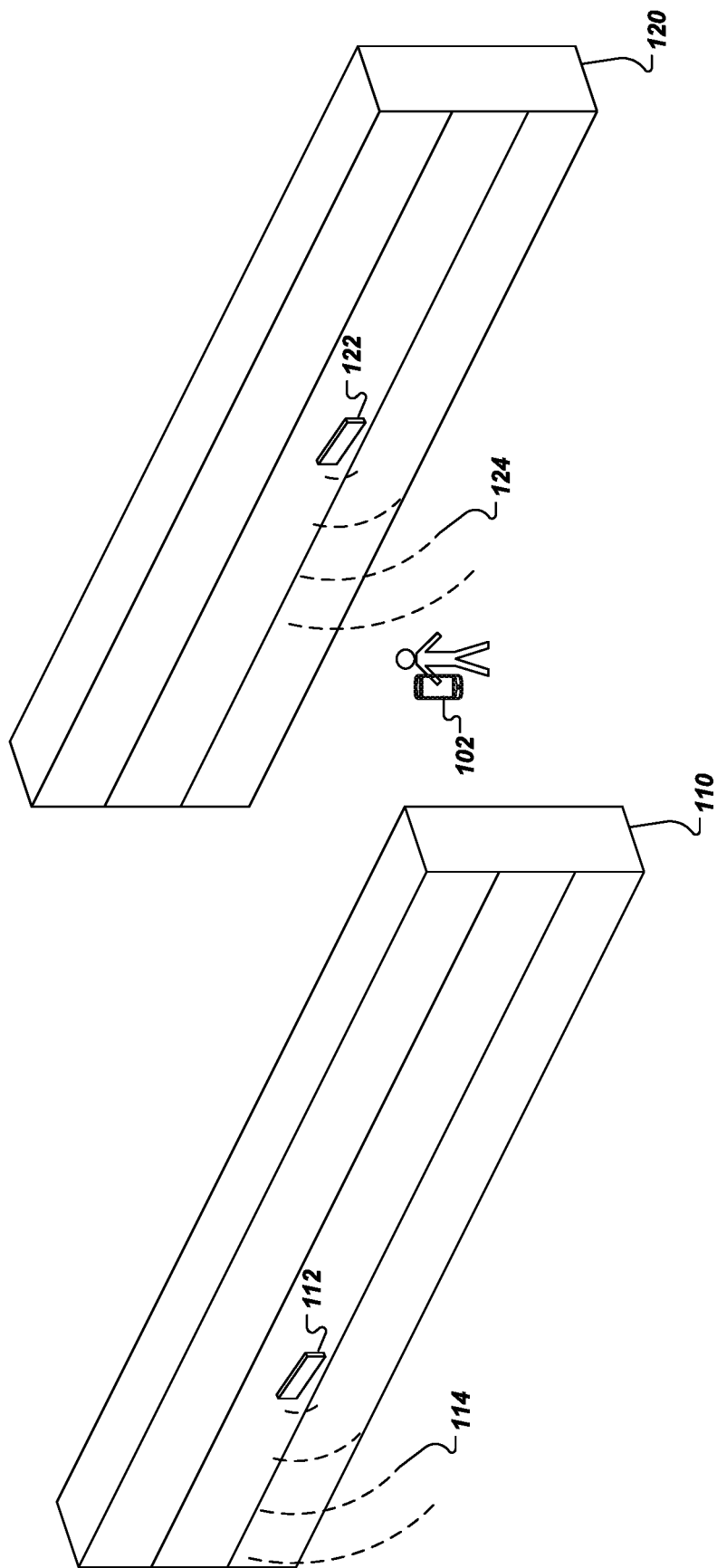
FIG. 1 illustrates a user inside a store that has installed wireless beacons.

Wireless beacons installed in a physical store location can help a user to obtain information about products in the store and to maintain a shopping list using a mobile user device. Each wireless beacon can be installed in a particular section of a store. A user device can receive signals emitted by the wireless beacon to present information about the items in a virtual shopping list that are located in the particular section of the store.

For example, a user application installed on the user device can determine that a user has entered a particular section of a physical store location using information communicated by a wireless beacon assigned to that section of the store. The user application can then present items on the user's shopping list that are located in that particular section. The user application can also arrange the items on the shopping list in an order according to distance from the user's current location and can provide directions to items on the shopping list that have not yet been purchased. The user application can also use past purchases by the user to guide the user to those items in the physical store environment and suggest new items for purchase by the user. The user application can also use past purchase history and the user's location in the store to present manufacturer offers in real-time, e.g., a coupon to switch detergent brands.

In this specification, wireless beacons refer to devices that use direct radio signal communication to directly communicate information wirelessly to other devices using mid-range to short-range radio signal protocols. In other words, the wireless beacons can directly communicate using radio signals without interaction with any intermediary devices between the communicating devices. Furthermore, a device can communicate information using radio signals, e.g. a user identifier, to another device without the devices engaging in a pairing process that requires user input and without requiring explicit user authorization to communicate with another device. The direct radio signal communication functionality can be performed by any appropriate computing device, e.g. wristwatch, a mobile phone, a portable music player, a tablet computer, a laptop computer, a personal digital assistant, a smartphone, a keychain beacon, or another handheld or wearable mobile device to name a few examples. The radio signals emitted by the devices for such wireless communication can be part of any appropriate standard for mid-range to short-range radio communications having an operable range of at least 1 meter and up to about 50 meters, e.g., Bluetooth 4.0 and Bluetooth Low Energy (BLE). The radio signals described in this specification can be any appropriate type of signal, e.g., a broadcast or advertiser signal that indicates presence of the device to nearby devices, or a connection signal that transmits data to a connected nearby device, to name a few examples. In this specification, a device can be said to be "nearby" if the device is within the operable range for performing direct radio signal communication with another user device.

FIG. 1 illustrates a user inside a store that has installed wireless beacons. A user holding a user device 102 stands between two store shelves 110 and 120. The user device 102 receives radio signals emitted by nearby wireless beacons in the store, e.g., the wireless beacons 112 and 122.

The wireless beacon 122 is installed, e.g., on the shelf 120, and emits a signal 124 that encodes information about a particular store section. For example, the signal 124 can encode the section-specific information, e.g., "Meats," to indicate that the wireless beacon 122 is installed in a section that includes meats. Nearby user devices, e.g., the user device 102, can use the information encoded in the signal 124 to present information about products sold in that section or about products on a user shopping list that are located in that section. The signal 124 can also encode product-specific information, e.g., "Laundry detergent" or brand specific information, e.g., "A1 brand laundry detergent" about products that are nearby.

The wireless beacon 112 is installed, e.g., on the shelf 110, in a different section of the store. Similarly, the wireless beacon 112 emits a signal 114 that can encode information about the different store section or nearby products or brands. The user device 102 may measure signal strength from nearby wireless beacons, and use the measurement to determine which wireless beacon is closest. The user device 102 may present information only for a closest wireless beacon or may blend or otherwise combine information relevant to information received multiple wireless beacons.

Because the user device 102 can receive the signals 114 and 124 using direct radio signal communication, an otherwise "offline" user device 102, e.g., a user device that has deactivated its WiFi and cellular data transceiver, can still obtain such information from the wireless beacons.

Figure 2:
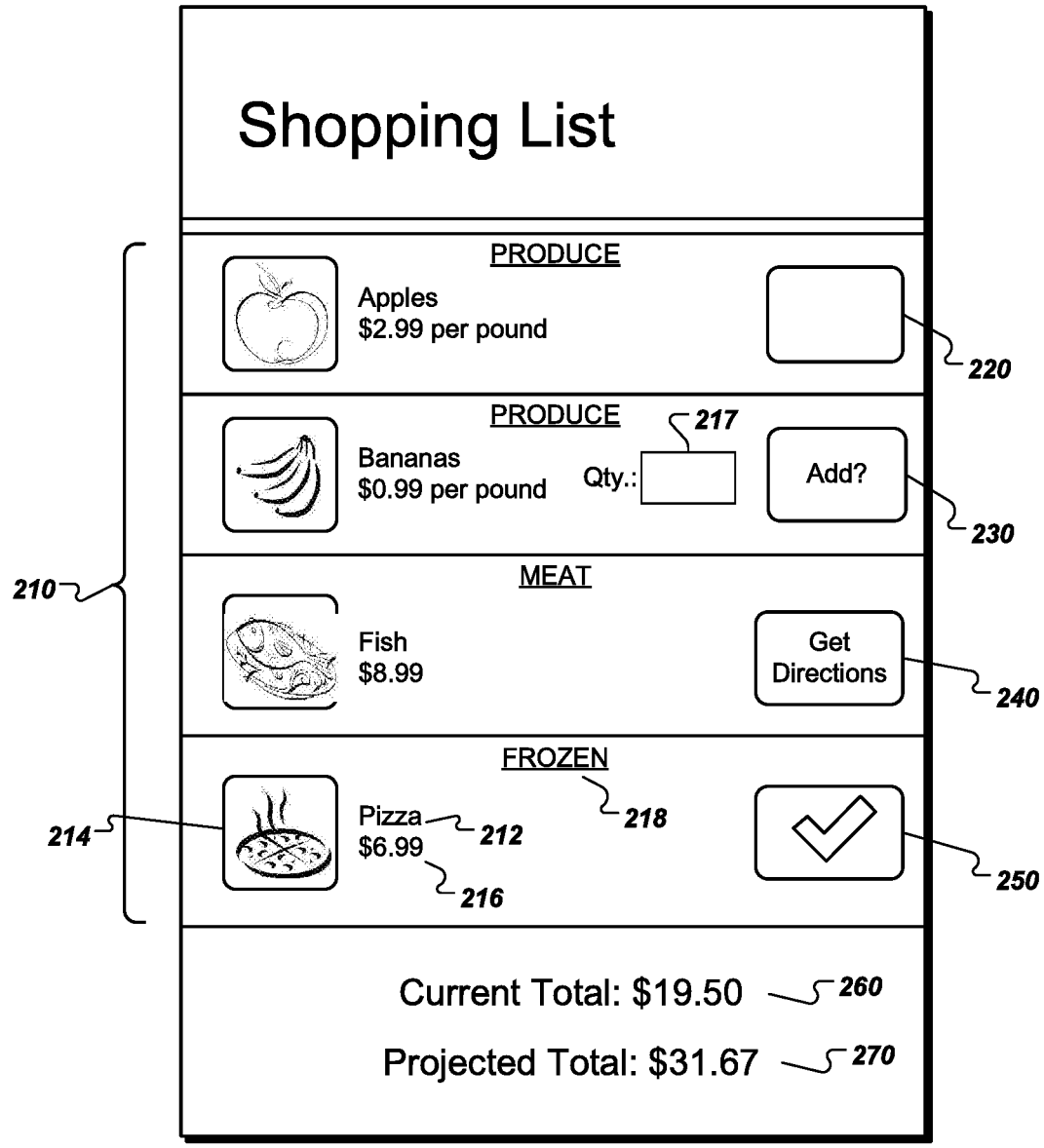
FIG. 2 is a diagram of an example view of a user interface of a user application installed on a mobile user device.

FIG. 2 is a diagram of an example view of a user interface 202 of a user application installed on a mobile user device. The example interface 202 can help a user to manage a shopping list using information obtained from wireless beacons installed in a store. Thus, a user device with poor indoor cellular reception or even an offline user device can present the information illustrated in FIG. 2 by using section information received directly from wireless beacons installed in the store.

The interface 202 presents a shopping list 210 of items on a display device of a mobile user device. The shopping list 210 is organized into rows, with each row including a name 212 of the item, e.g., "Pizza," an image 214 of the item, a price 216 of the item, e.g., "$6.99," and a store section 218 of the item. A row can also include an input field 217 to enter a quantity of an item purchased, e.g., a weight or a number.

The interface 202 includes icons that help a user manage the shopping list. A blank icon 220 indicates that a particular item has not yet been selected by the user. For example, the user can select the blank icon 220, e.g., after the user places the item in a physical shopping cart, which can change the blank icon 220 into a checked icon 250. Alternatively or in addition, the user application may automatically change a blank icon to a checked icon if certain criteria are met. For example, the user application can change a blank icon for a particular item to a checked icon if the user application detects that the user lingers for at least a threshold period of time at a particular section containing the particular item. Detection that the user has lingered at a particular section can be accomplished by detecting that the signal strength of the wireless beacon for that section has remained above a certain threshold for the threshold period of time. Other information, e.g., signal strength of other beacons or data from motion sensors in the user device can be used.

The user application can display an add icon 230 for an item in the shopping list when the user is near the item in question. The add icon 230 can serve as a suggestion to the user to look for the item in question and to add it to the physical shopping cart. Each row can also include a navigation icon 240 that the user can select to receive indoor navigation directions to the location of the item within the store.

The interface 202 also includes a current total 260 of items that have been added, e.g., as indicated by items having the checked icon 220. The interface 202 also includes a projected total 270 for all items in the shopping list.

A user can assemble the shopping list 210 before arriving at the store using a mobile device or another computing device, e.g., a desktop computer. The user can also assemble the shopping list as the user selects items in the store, in which case the user application may only present the current total 260 and not the projected total 270.

The user device can obtain one or more of the items of information in the example interface 202 directly from wireless beacons installed in the store. For example, price and other information can be obtained from a product-specific wireless beacon that is installed proximate to particular items within the store.

The user device can also use section-specific wireless beacons to arrange items in the shopping list. For example, if the user device receives a signal from a wireless beacon in the "Produce" section, the user device can order the shopping list so that produce items appear near the top of the list and remaining items appear in descending order. For example, if the meat section is further away than the frozen food section, the user device presents information about the fish item on the list above the pizza item on the list. For each of the items located in a closest section, the user application may present an add icon 230 to suggest to the user that the items be added to the physical shopping cart while the user is in that section.

Figure 3:
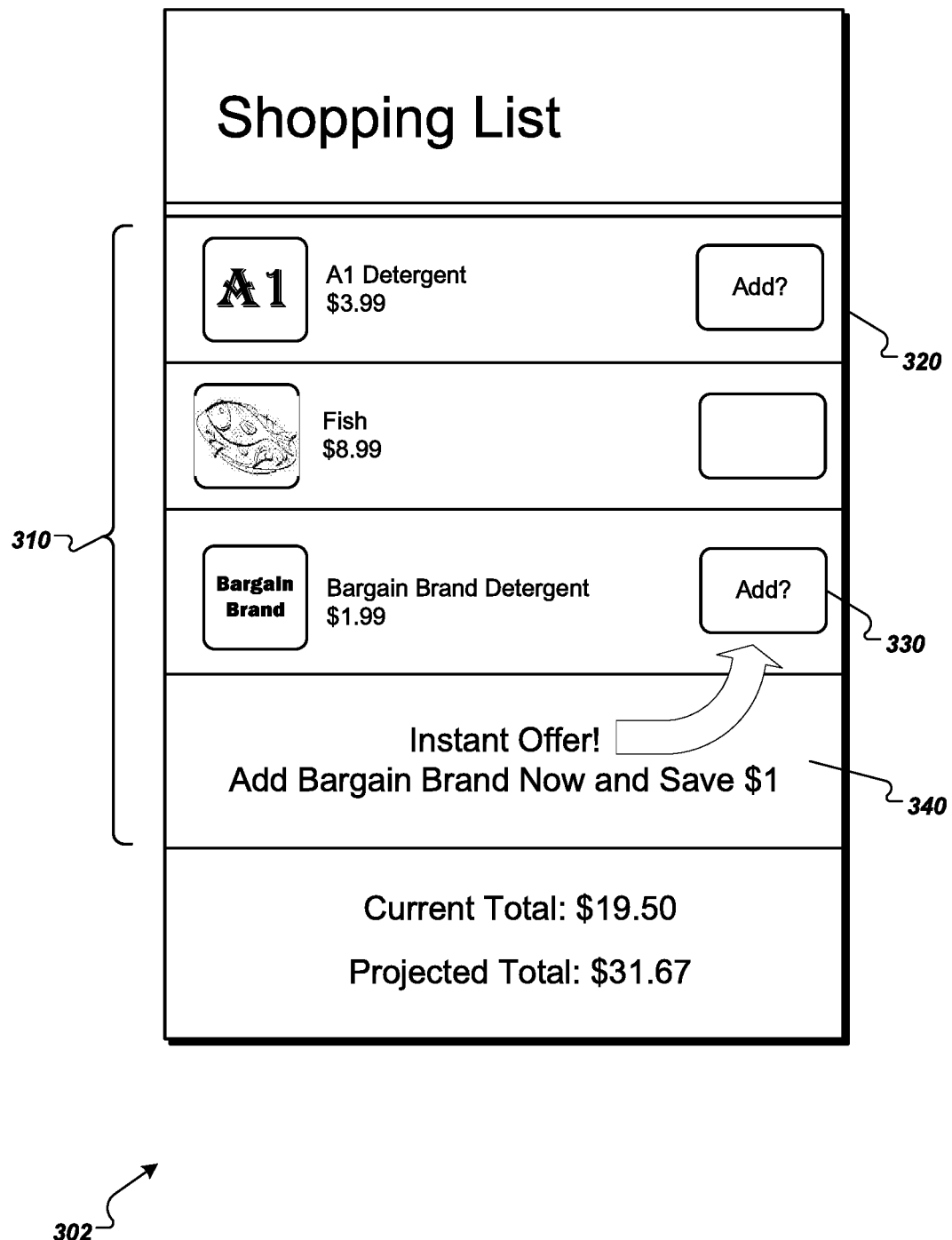
FIG. 3 is a diagram of an example view of a user interface of a user application installed on a mobile user device.

FIG. 3 is a diagram of an example view of a user interface 302 of a user application installed on a mobile user device. The example interface 302 can present real-time offers for nearby products. The user can thus easily compare prices and receive offers for items in a section of the store in which the user is currently located. The user interface 302 presents a list 310 of items in a shopping list organized into rows. The information presented for each item can be obtained directly from a wireless beacon installed in the store that is associated with each item or obtained from a serving system.

The user interface 302 can also present offer information 340 about a real-time for nearby items. For example, the offer information 340 indicates that the user can save $1 if the user purchases Bargain Brand Detergent. The offer information 340 can be triggered by the user having a particular item listed in a shopping list, e.g., A1 Detergent 320. The offer information 340 can also be triggered by the user being a particular section of the store, e.g., the detergent section, as determined by a signal received from a wireless beacon. The user can accept the offer by selecting an add icon 330 presented with the item information.

Figure 4:
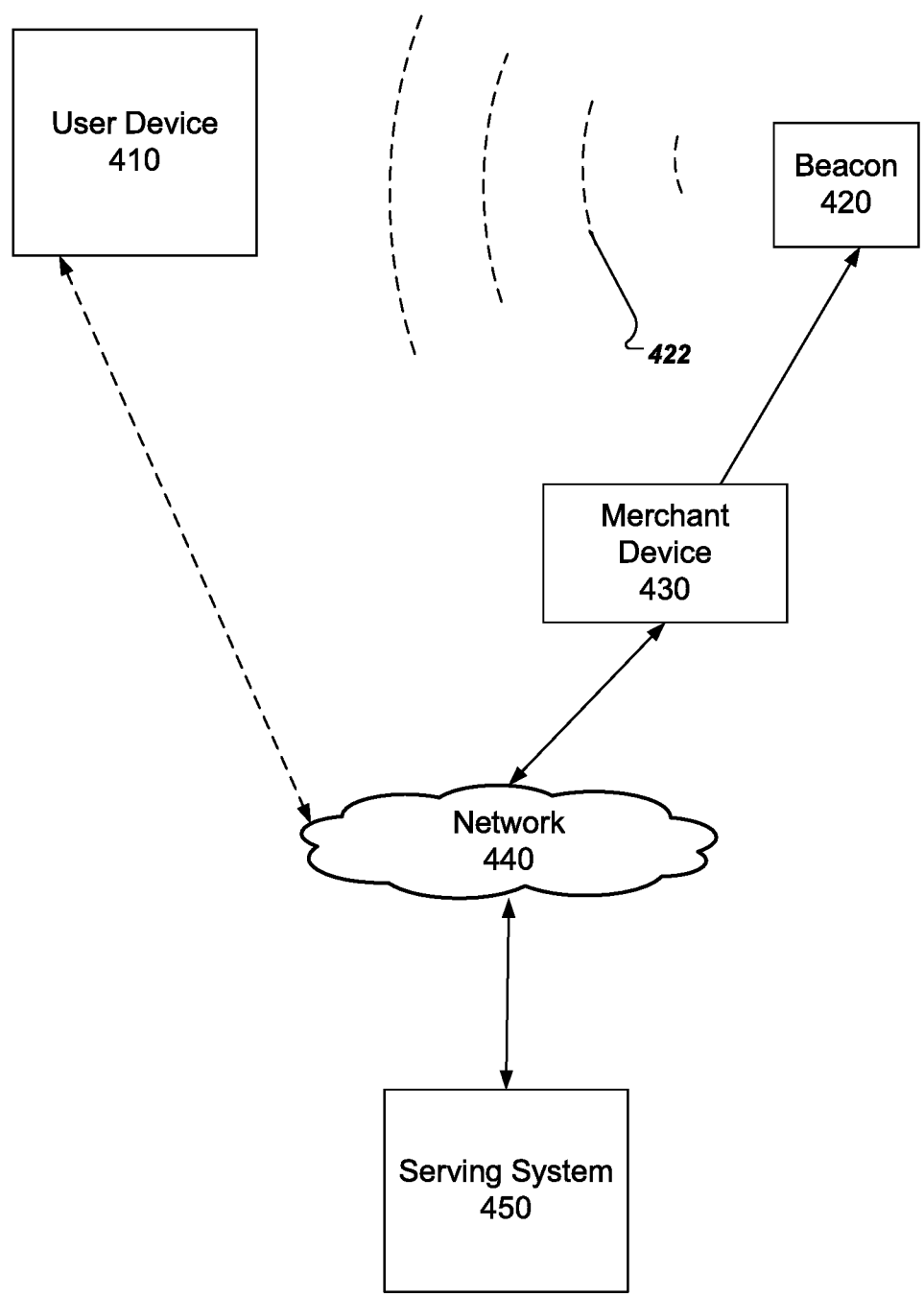
FIG. 4 is a block diagram of an example system.

FIG. 4 is a block diagram of an example system. The example system includes a user device 310, a wireless beacon 420, and a merchant device 430. The wireless beacon 420 can communicate directly with the user device 310 using direct radio signal communication with radio signals 422. The merchant device 432 can communicate with a serving system 450 over a network 440. The network 440 can be a wireless cellular network, a wireless local area network, a Wi-Fi network, a mobile telephone or another telecommunications network, a wired Ethernet network, a private network such as an intranet, a public network such as the Internet, or any appropriate combination of such networks. The user device 410 may or may not be configured to communicate with the serving system 450 over the network 340.

The merchant device 430 can install a merchant application received from the serving system 450 that can be used to configure the wireless beacon 420. In some implementations, the serving system 450 issues item and product-specific identifiers for specific items or products sold by the merchant, and which will be broadcast by the wireless beacon 420.

The user device 410 can install user application received from the serving system 450. The user application can be used to receive signals 422 from the wireless beacon 420 and to present, on a display device of the user device 410, a user interface that includes item information received from the wireless beacon 420.

Figure 5:
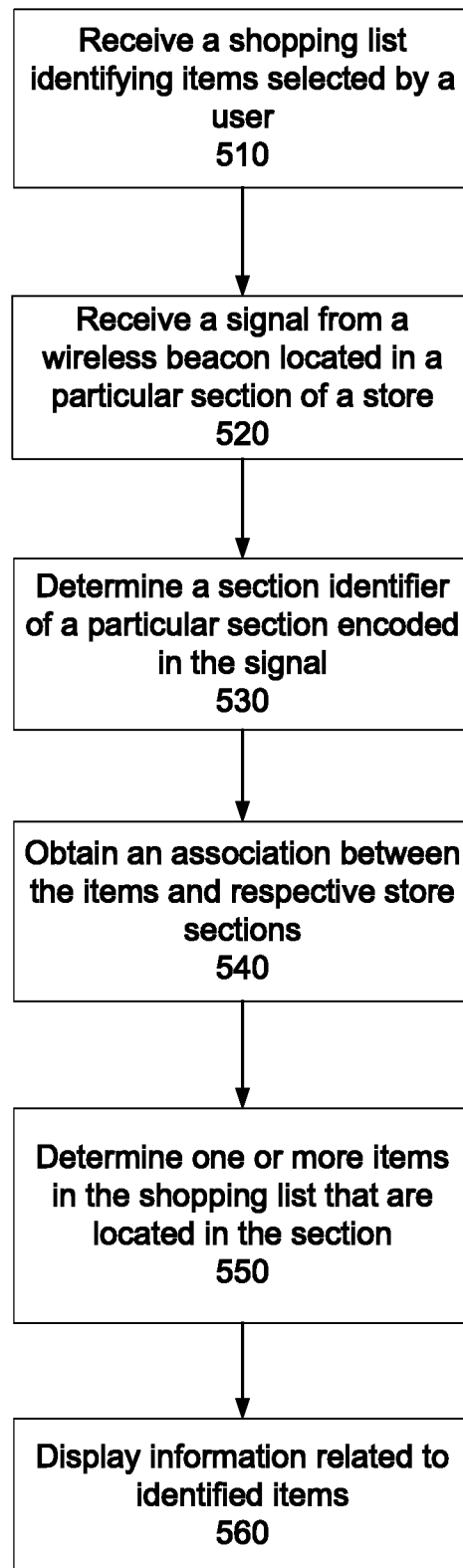
FIG. 5 is a flow chart of an example process for presenting information about items in a particular store section.

FIG. 5 is a flow chart of an example process for presenting information about items in a particular store section. In general, a user device receives a signal from a wireless beacon that encodes a store section. The user device then presents information about items that are located in the particular store section. The example process can be implemented by one or more computer programs installed on one or more computers. The process will be described as being performed by an appropriately programmed user device, e.g., the user device 310 of FIG. 3.

The user device obtains shopping list data identifying one or more items selected by a user (510). A user can create a virtual shopping list on the user device, using a desktop computer, or using another computing device. The shopping list stores item identifiers and other associated information for each item, e.g., a picture, a description, a price, a manufacturer, a website URL, to name a few examples. The item identifiers can be maintained by the serving system, the item manufacturers, a merchant, or another party.

The shopping list can be stored on the user device or can be stored at a serving system in an account associated with the user. The user device can then access the shopping list for display to the user through an application installed on the user device. The user device can access the shopping list from local storage of the user device, or the user device can access the shopping list at a serving system over a network.

The user device receives a signal from a wireless beacon located in a particular section of a store (520). The wireless beacon can be part of a number of wireless beacons installed throughout a physical store location. For example, a merchant can divide the store into a number of sections and install a wireless beacon in each section. The merchant can use a merchant device to program each wireless beacon to broadcast a section identifier for the appropriate section.

The merchant can obtain section identifiers from a serving system that uses a global categorization of store sections across merchants. For example, the section identifiers can correspond to different grocery store sections, e.g., meat, dairy, produce, to different clothing store sections, e.g., men, women, boys, girls, or to any other appropriate store division or categorization. The merchant can communicate with a serving system to obtain the global section identifiers. The merchant can then use a merchant device to program wireless beacons in each section to broadcast the appropriate section identifier.

The user device determines a section identifier from the signal (530). The user device may first engage in an automatic pairing process with the wireless beacon in which one or more packets are exchanged between the devices in order to set up direct radio signal communication between the devices. The user device can then obtain a section identifier encoded in the signal emitted by the wireless beacon.

If the user device receives signals from multiple wireless beacons, the user device can choose a closest wireless beacon, e.g., by comparing the strength of the signal received from each wireless beacon. In some implementations, the user device can select sections identifiers corresponding to multiple wireless beacons.

The user device obtains an association between the items in the shopping list and respective store sections (540). The association provides information about in which sections particular items in the shopping list are located within the store. The association can be defined by a serving system, the merchant, or another party.

For example, the merchant can use a merchant device to upload, to a serving system, an association between items for sale in the store and associated store sections. The user device can then access the association uploaded by the merchant. For example, if apples are an item on the shopping list, the user device can obtain an association between apples and an identifier for the produce section of the store.

The user device determines one or more items in the shopping list that are located in the section (550). The user device can use the association between the items in the shopping list and respective store sections to identify items that are located in the section of the store determined by the wireless beacon.

The user device displays information related to the one or more items (560). The user device can present a variety of information about items located in the section. For example, the user device can present only a list of items that are located in the section, along with information about the items, e.g., a description, a price, and whether the item has already been selected for purchase by the user. The user device can display a suggestion icon, e.g., an "Add" icon, for items that are in the section but have not yet been selected by the user. If the user device is receiving signals from multiple wireless beacons from different store sections, the user device can generate a blended list of items from the multiple sections.

The user device can also present items in the shopping list in an order, with items determined to be in the section first in a list. In addition, unselected items within the determined section can be presented above items that the user has indicated as being selected. The user device may also arrange items in other sections in an increasing order by distance to the current section, as measured from the current section or a location of the user device. The user device can also present an option to obtain a map of the store or navigation directions to other items in the shopping list.

The user device can also automatically determine that the user has selected one or more items for purchase, e.g., by placing the items in a physical shopping cart. For example, if the user device has remained near a particular section for a threshold period of time, e.g., at least 1 minute, the user device can automatically determine that the user has selected the items in that section for purchase.

The user device can also automatically determine that the user has selected an item for purchase from a wireless device installed in a physical shopping cart. For example, the shopping cart can have installed on it a device that communicates with item-specific wireless beacons embedded in or coupled to the items themselves. The shopping cart beacon can then communicate with the user device to provide item identifiers of the items that are determined to be in the shopping cart. The shopping cart device can determine that items are in the shopping cart by computing a measurement of signal strength emitted by the item-specific wireless beacons embedded in the items.

The user device can also obtain information about current offers for one or more items in the section and present the offers when the user is determined to be in the section. The user can redeem the offer by selecting the item mentioned in the offer and carrying through with the purchase of the item.

The offers can be identified by a serving system based on various criteria, in addition to the user being located in a particular section of the store. For example, the offers can be identified based on items in the shopping list of the user. The serving system can identify offers for the items currently in the user's shopping list, or the serving system can identify offers for products that are competing with or otherwise related to the products in the shopping list.

The serving system can also identify offers based on the purchase history of the user. For example, if the user has purchased a particular brand in the past, the serving system can identify offers for products based on that particular brand or on a competing brand. The serving system can also identify offers for products that other people have purchased with products in the user's shopping list.

The serving system can also identify offers based on regularity of a particular purchase by the user. For example, if the user typically buys milk once per week, the serving system can identify offers for milk if the user is in the milk section and about a week has passed since the user last purchased milk. The serving system can also use pattern matching to determine items that users typically purchase when in particular store sections. For example, the serving system may determine that users that buy milk also typically buy diapers when in the diaper section of the store. Thus, if the user has milk in the shopping list, the serving system can present an offer for diapers when the user is in the diaper section of the store.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
    detecting, at a server, presence of a user device at a facility, the user device having a software application executing thereon that is configured to facilitate selection of one or more items from a list of items available for purchase at the facility, at least a portion of the list of items being displayed via the software application;
    tracking, by the server, a location of the user device within the facility relative to each item on the list, the tracking being facilitated by one or more electronic location determining components that are at least one of installed at the facility or on the user device; and
    based on the location of the user device within the facility relative to a location of individual of the items and information on a change in a location of any of the items on the list, dynamically updating, by the server, the portion of the list of items displayed on the user device.

2. The computer-implemented method of claim 1, further comprising:
    determining, by the server, that one or more of the items are selected for purchase by a user associated with the user device, wherein dynamically updating the portion of the list of items includes adding the one or more of the items to the portion of the list of items.

3. The computer-implemented method of claim 1, further comprising:
    providing, by the server, at least one of a suggestion or an incentive corresponding to the one or more of the items selected for purchase.

4. The computer-implemented method of claim 1, wherein dynamically updating the portion of the list of items includes rearranging an order of one or more items included in the portion of the list based on the location of the user device and information on one or more items present on shelves at the location of the user device.

5. The computer-implemented method of claim 4, wherein the information on the one or more items present on the shelves is derived from information on locations of the items available to the server.

6. The computer-implemented method of claim 5, further comprising:
    periodically receiving, by the server, updated information on the locations of the items offered for sale within the facility.

7. The computer-implemented method of claim 1, wherein the facility is a grocery store and each of the user and an operator of the facility has a respective account at the server including respective financial information for processing payments for items on the portion of the list of items selected by the user for purchase.

8. A server comprising:
    memory having computer-readable instructions stored therein; and
    one or more processors configured to execute the computer-readable instructions to:
        detect presence of a user device at a facility, the user device having a software application executing thereon that is configured to facilitate selection of one or more items from a list of items available for purchase at the facility, at least a portion of the list of items being displayed via the software application;
        track a location of the user device within the facility relative to each item on the list, the tracking being facilitate by one or more electronic location determining components that are at least one of installed at the facility or on the user device; and
        based on the location of the user device within the facility relative to a location of individual of the items and information on a change in a location of any of the items on the list, dynamically update the portion of the list of items displayed on the user device.

9. The server of claim 8, wherein the one or more processors are configured to execute the computer-readable instructions to:
    determine that one or more of the items are selected for purchase by a user associated with the user device; and dynamically update the portion of the list of items by adding the one or more of the items to the portion of the list of items.

10. The server of claim 8, wherein the one or more processors are configured to execute the computer-readable instructions to:
provide at least one of a suggestion or an incentive corresponding to the one or more of the items selected for purchase.

11. The server of claim 8, wherein the one or more processors are configured to execute the computer-readable instructions to dynamically update the portion of the list of items includes rearranging an order of one or more items included in the portion of the list based on the location of the user device and information on one or more items present on shelves at the location of the user device.

12. The server of claim 11, wherein the information on the one or more items present on the shelves is derived from information on locations of the items available to the server.

13. The server of claim 12, wherein the one or more processors are configured to execute the computer-readable instructions to:
periodically receive updated information on the locations of the items offered for sale within the facility.

14. The server of claim 8, wherein the facility is a grocery store and each of the user and an operator of the facility has a respective account at the server including respective financial information for processing payments for items on the portion of the list of items selected by the user for purchase.

15. One or more non-transitory computer-readable medium having computer-readable instructions stored therein, which when executed by one or more processors, cause the one or more processors to:
detect presence of a user device at a facility, the user device having a software application executing thereon that is configured to facilitate selection of one or more items from a list of items available for purchase at the facility, at least a portion of the list of items being displayed via the software application;
track a location of the user device within the facility relative to each item on the list, the tracking being facilitate by one or more electronic location determining components that are at least one of installed at the facility or on the user device; and
based on the location of the user device within the facility relative to a location of individual of the items and information on a change in a location of any of the items on the list, dynamically update the portion of the list of items displayed on the user device.

16. The one or more non-transitory computer-readable medium of claim 15, wherein execution of the computer-readable medium by the one or more processors cause the one or more processors to:
determine that one or more of the items are selected for purchase by a user associated with the user device; and
dynamically update the portion of the list of items includes adding the one or more of the items to the portion of the list of items.

17. The one or more non-transitory computer-readable medium of claim 15, wherein execution of the computer-readable medium by the one or more processors cause the one or more processors to:
provide at least one of a suggestion or an incentive corresponding to the one or more of the items selected for purchase.

18. The one or more non-transitory computer-readable medium of claim 15, wherein execution of the computer-readable medium by the one or more processors cause the one or more processors to dynamically update the portion of the list of items by rearranging an order of one or more items included in the portion of the list based on the location of the user device and information on one or more items present on shelves at the location of the user device.

19. The one or more non-transitory computer-readable medium of claim 18, wherein the information on the one or more items present on the shelves is derived from information on locations of the items available to a server.

20. The one or more non-transitory computer-readable medium of claim 19, wherein the one or more processors are configured to execute the computer-readable instructions to:
periodically receive updated information on the locations of the items offered for sale within the facility.

\* \* \* \* \*